Figure 1:
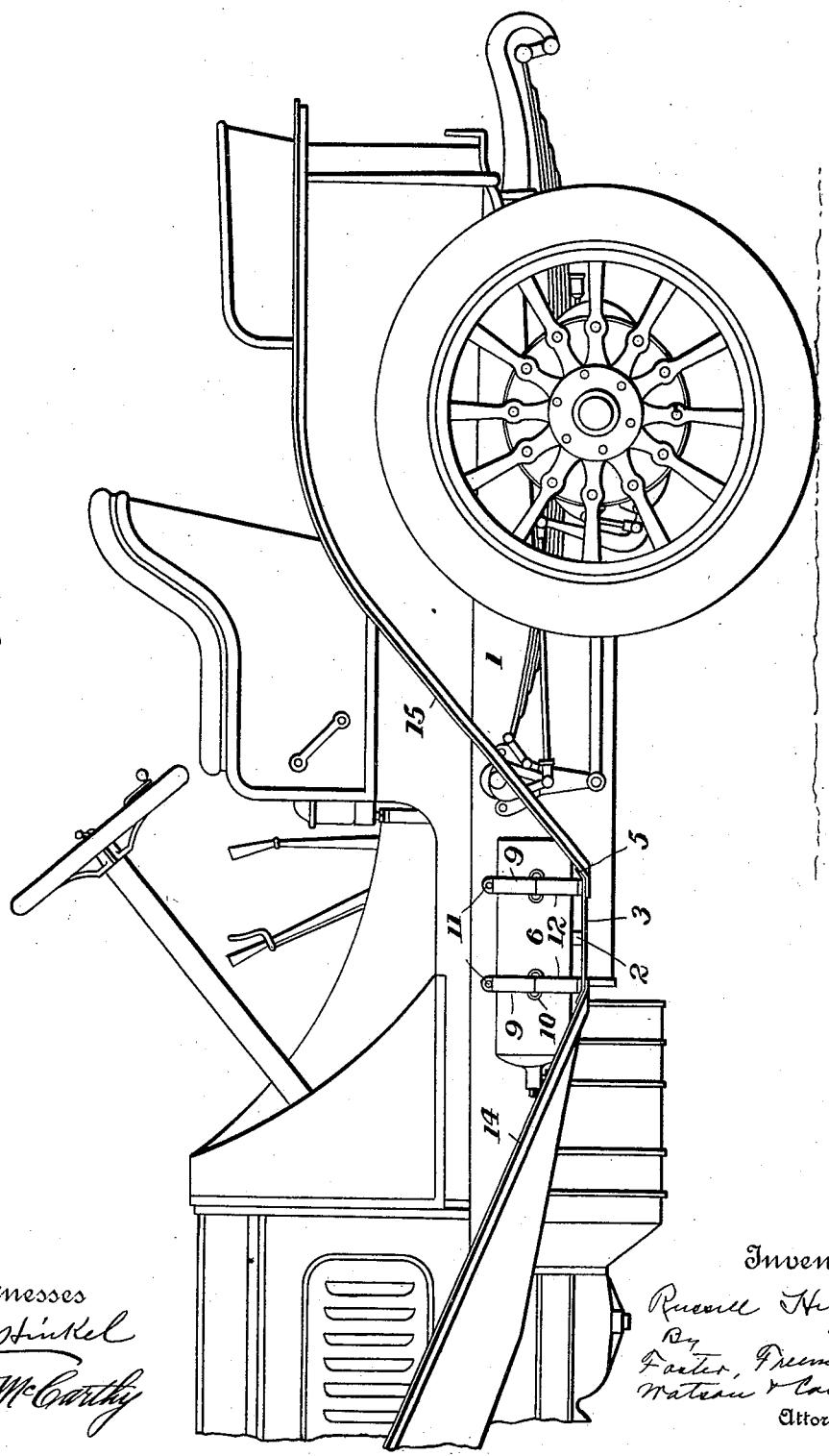

R. HUFF.
COMBINED TANK BRACKET AND STEP FOR MOTOR VEHICLES.
APPLICATION FILED OCT. 30, 1908.

1,023,848.

Patented Apr. 23, 1912.
2 SHEETS—SHEET 1.

Witnesses

Inventor
Russell Huff
By Foster, Freeman, Watson & Coit
Attorneys

R. HUFF.
COMBINED TANK BRACKET AND STEP FOR MOTOR VEHICLES.
APPLICATION FILED OCT. 30, 1908.
1,023,848.
Patented Apr. 23, 1912.
2 SHEETS—SHEET 2.
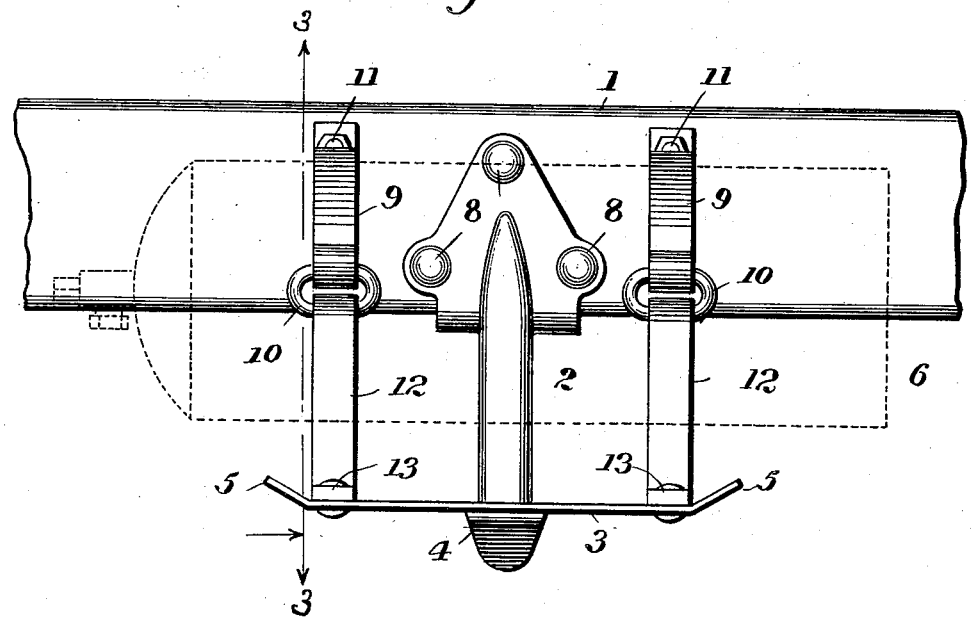
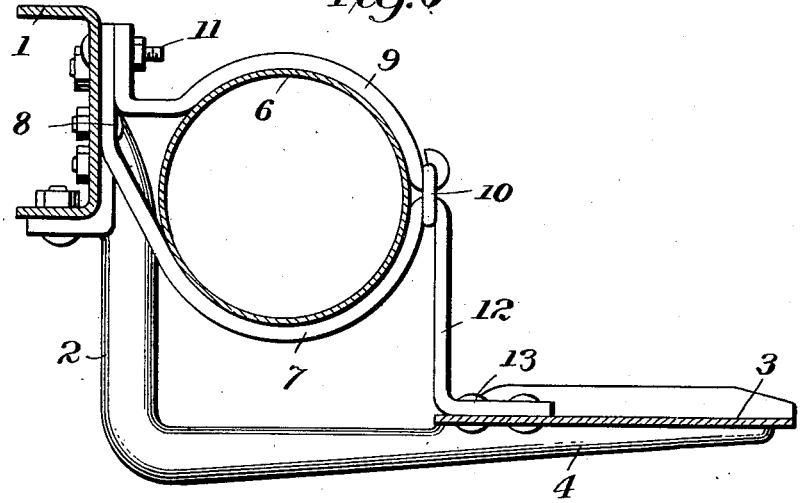

UNITED STATES PATENT OFFICE.

RUSSELL HUFF, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

COMBINED TANK-BRACKET AND STEP FOR MOTOR-VEHICLES.

1,023,848.   Specification of Letters Patent.   Patented Apr. 23, 1912.

Application filed October 30, 1908. Serial No. 460,301.

*To all whom it may concern:*

Be it known that I, RUSSELL HUFF, a citizen of the United States, and resident of Detroit, in the county of Wayne and State of Michigan, have invented certain new and useful Improvements in Combined Tank-Brackets and Steps for Motor-Vehicles, of which the following is a specification.

This invention relates to motor vehicles and particularly to a bracket for supporting a pressure tank such as the Prest-o-lite tanks now on the market and for wholly or partially supporting a step. In the preferred form of the invention the step is provided with a main bracket and the pressure tank brackets act as stay rods or auxiliary brackets for the step, making the latter more rigid and free from vibration. In the form of the bracket shown the tank itself is a part of the combination forming the stay rods for the step.

In the drawings: Figure 1 is a side view of the main parts of a motor vehicle showing my invention applied thereto; Fig. 2 is an enlarged side elevation of a part of one of the side bars of the motor vehicle frame showing my step and bracket secured thereto; and Fig. 3 is a section on the line 3—3 of Fig. 2.

In the drawings, 1 is the channel side bar of a motor vehicle frame; 2 is an L-shaped drop bracket suspended from said frame, and 3 is an approximately square sheet metal step suitably secured to the outwardly extending horizontal arm 4 of the bracket 2. The step 3 may be provided on its forward and rearward edges with diagonally extending flanges 5 to which the front and rear mud guards 14, 15, respectively, may be attached. In a step of this character the bracket 2 is ordinarily its sole support, and when this is true, the bracket must be made very heavy to withstand the twisting and bending strains to which it is subjected in practical use. My invention includes braces for the step which relieve the strains on the bracket and render the step steadier and stronger, and which at the same time serve to removably support a pressure tank as hereafter described.

In most motor vehicles of the present day some sort of pressure tank is carried, either for supplying gas to the headlights or for supplying air to the pneumatic tires, and the usual form of such tanks is cylindrical, about 6"x18". The tank must be removably secured to some convenient part of the vehicle frame, and the present invention combines a bracket or supporting means for such a tank and a stay rod to steady or strengthen the step in a single element. The pressure tank 6 is shown in dotted lines in Fig. 2 and in full lines in section in Fig. 3. The combination tank brackets and stay rods are composed of two pairs of semi-cylindrical straps which surround the tank at convenient points, each pair comprising a lower strap 7 which is secured to the frame by a bolt 8 and an upper strap 9 hinged to the lower strap by a ring 10 and removably secured to the frame by a bolt 11, which latter bolt also passes through the end of the strap 7. Each of the lower straps 7 is provided with an arm 12 which is connected at its end with one of the ends of the step 3 as at 13. With this construction it will be observed that the supporting straps or brackets for the pressure tank not only firmly secure the tank to the frame, but also aid in supporting the step 3 and guarding it against vibration. While I have referred to the parts 7 and 9 as straps or rods, it will be understood that they have considerable rigidity and being secured firmly to the vehicle frame at one end really constitute supporting brackets.

It will be observed that the step 3 is offset considerably from the side of the frame 1 and that the tank 6 is arranged between the step and the frame whereby it takes no room on the step and does not obstruct the passage into and out of the vehicle. The tank so held is readily accessible, may be easily removed and replaced, and is in such position that its supply of gas or air may be conveniently turned on for use as desired. With this construction the bracket 2 may be made considerably lighter than in the ordinary construction, as the tank brackets aid greatly in supporting the step. It is particularly to be noted that the efficacy of the tank brackets in supporting the step is greatly enhanced by the presence of the tank itself within the brackets, as the straps 7 and 9 are braced by the inclosed tank, and with the extensions 12 form stay rods or straps of considerable strength. In other words, the tank and straps coöperate to brace the step.

While I have shown my bracing straps used in connection with the L-shaped bracket which constitutes the main support for the step, it will be understood that the L-shaped bracket may be omitted without departing from my invention, and that the step may be supported altogether by the brackets which engage the tank.

Having thus described the invention, what is claimed is:

1. In a motor vehicle, the combination with the frame of a tank supporting bracket secured to the frame and having a seat for a pressure tank, means for securing a tank to said bracket, a step carried by the frame, and a connection between the tank bracket and the step for mutually bracing said bracket and step.

2. In a motor vehicle, the combination with the frame of two pressure tank supporting brackets having seats for a pressure tank, means for securing a tank to said brackets, a step supported from the frame by a connection arranged between said brackets, and connections between said brackets and the step for mutually bracing the brackets and step.

3. In a motor vehicle, the combination with the frame and a step arranged below the frame and offset therefrom, of a bracket connecting said frame and step, said bracket having a curved seat, a pressure tank resting on said seat, and a strap for securing said tank to said bracket.

4. In a motor vehicle, the combination with the frame, of a step carried by and extending outward from the frame, a bracket connecting the frame and step and having a curved seat, a pressure tank resting in said seat, and means for securely holding the tank upon its seat.

5. In a motor vehicle, the combination with the frame and the step, of a drop bracket hung from the frame and having an arm secured to the central portion of the step, a pair of brackets connecting the ends of the step with the frame, said brackets having curved seats formed therein, a pressure tank resting on said seats and straps for removably securing said tank to said pair of brackets.

In testimony whereof I affix my signature in presence of two witnesses.

RUSSELL HUFF.

Witnesses:
L. C. TENNEY,
HOWARD HARKNESS.

---

Copies of this patent may be obtained for five cents each, by addressing the "Commissioner of Patents, Washington, D. C."